May 3, 1960 L. B. McMANIS 2,935,697

SEISMIC AMPLIFIER GAIN CONTROL

Filed July 18, 1957 3 Sheets-Sheet 1

INVENTOR.
LOUIS B. McMANIS

BY Newell Pottorf

ATTORNEY

May 3, 1960 L. B. McMANIS 2,935,697

SEISMIC AMPLIFIER GAIN CONTROL

Filed July 18, 1957 3 Sheets-Sheet 2

INVENTOR.
LOUIS B. McMANIS

BY Newell Pottorf

ATTORNEY

INVENTOR.
LOUIS B. McMANIS
BY Newell Pottorf
ATTORNEY

United States Patent Office 2,935,697

Patented May 3, 1960

2,935,697

SEISMIC AMPLIFIER GAIN CONTROL

Louis B. McManis, Houston, Tex., assignor to Pan American Petroleum Corporation, Tulsa, Okla., a corporation of Delaware Application July 18, 1957, Serial No. 672,840

5 Claims. (Cl. 330—145)

This invention relates to seismic geophysical surveying and is directed to improvements in the gain control of seismic amplifiers. More specifically, it is directed to seismic gain controls of the type utilizing diodes as attenuating elements at two or more points of a seismic amplifier channel.

In controlling the gain of seismic amplifiers, a number of problems arise, of which two of the most important are concerned with the wide range of gain variation that must be accommodated and the stability of the amplifier at high gain. As is well known, the gain of a seismic amplifier must be varied over a very wide range in order to record both weak and strong signals. Due to the non-linear characteristics of thermionic diodes, attenuator elements using them, particularly when applied to two or more amplifier stages, are frequently considered preferable for providing gain control over the desired wide signal-amplitude range.

For recording weak but useful seismic signals, high sensitivity of the amplifier is also necessary. When this is combined with a fast-acting, wide-range gain control, however, high sensitivity introduces problems of amplifier stability, because the frequency responses of the amplifier channel and of its gain-controlling feedback loop are not very widely separated. In other words, the loop which provides gain control may also be a path of undesired stray signal transmission which can cause oscillation or other malfunctioning of the amplifier.

Furthermore, the very property of non-linearity which makes thermionic diodes useful in wide-range gain controls is itself a cause of distortion. Thus, when strong signals occur, particularly if they are of a frequency outside of the range of interest, the non-linearity of the diodes can cause the generation of harmonic frequencies which will constitute noise if they happen to fall within the frequency range of the desired signals.

It is accordingly a primary object of my invention to provide a novel and improved seismic gain-control system having wide range but at the same time introducing a minimum of distortion and amplifier instability. A further object is to provide an improved seismic gain-control system utilizing two stages of attenuation wherein the ratio of attenuation is divided between the stages in such a way as to increase the stability of the amplifier and decrease distortion due to large-amplitude signals. Still further objects, uses, and advantages of the invention will become apparent as the description proceeds.

Briefly stated, the foregoing and other objects are accomplished in accordance with my invention by providing that the first of two diode attenuating sections of an amplifier channel shall produce increased attenuation, particularly at high signal levels, over and above that which would normally be provided. This may be done by limiting the attenuation performed by the second diode section, but it is preferred to vary the ratio of attenuation performed by the two sections so that it changes or shifts under the respective conditions of high and low gain.

The manner in which this is accomplished will be best understood by reference to the accompanying drawings forming a part of this application, in which drawings, Figure 1 is a schematic block diagram of a conventional amplifier channel of the type to which the invention applies;

Figure 1:
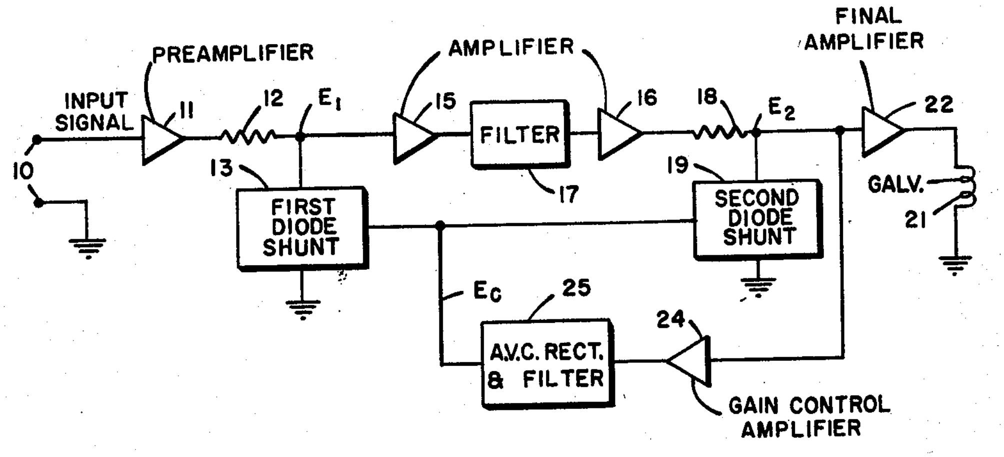

Referring now to the drawings in detail and particularly to Figure 1, this figure shows in block diagrammatic form an amplifier channel of the type to which this invention is applicable. This amplifier is in every way conventional. The input signal, which may be the output of a seismometer or a seismometer group, is applied to the input terminals 10 which are connected to a preamplifier stage or stages 11. This preamplifier feeds an attenuator network in the form of an L-pad, consisting of a fixed series resistor 12 followed by a variable shunt resistance 13 to ground. The shunt resistance 13 preferably comprises a thermionic diode bridge circuit which will be more fully described later, the effective resistance of which circuit is determined by a control voltage $E_c$ fed from an automatic volume control (AVC) loop which takes its signal from a subsequent stage of the amplifier channel.

The signal thus initially attenuated is further amplified by a main amplifier consisting of one or more stages 15 and 16, which amplifier typically includes a filter 17 of band-pass or high-pass type for discrimination against undesired waves. The gain of the system is further regulated by a second L-pad attenuator of the same type as the first, consisting of a series resistor 18 connected to the output of amplifier stage 16 shunted by the variable shunt resistance 19, similar in form to the diode shunt 13. The resistance of shunt resistor 19 is similarly controlled by the voltage $E_c$.

Such further amplification as is required to drive a galvanometer element 21 or other recording element, such as a magnetic recording head or pen recorder, is supplied by a final amplifier 22 which operates upon the output of the second attenuator 18, 19. Connected to the signal-carrying lead at a point following the second attenuator is the input of a gain-control amplifier 24. The output of the gain-control amplifier 24, rectified and smoothed or filtered by an appropriate circuit 25, is then fed to the diode shunt resistors 13 and 19 as the control voltage $E_c$.

The voltage level $E_1$ of the first diode shunt 13 is the voltage which could be measured between the point labeled $E_1$ and ground by an alternating-current (A.C.) voltmeter. Similarly, the voltage level of the second diode shunt 18 is designated by $E_2$. These voltage levels depend upon the effective resistance of the diode shunts, which in turn depend upon the applied control voltage $E_c$. $E_c$ in its turn depends ultimately upon two factors: the level of the signal at the preamplifier input terminals 10 and the extent to which this signal is passed by the filter 17 into the AVC feedback loop including amplifier 24 and rectifier-filter 25.

Generally speaking, the sensitivity of thermionic diodes to a given change in control voltage $E_c$ varies both with the type of diode and with individual diodes of a given type. It varies also somewhat in use as the diodes age and their emission drops off.

Figure 2:
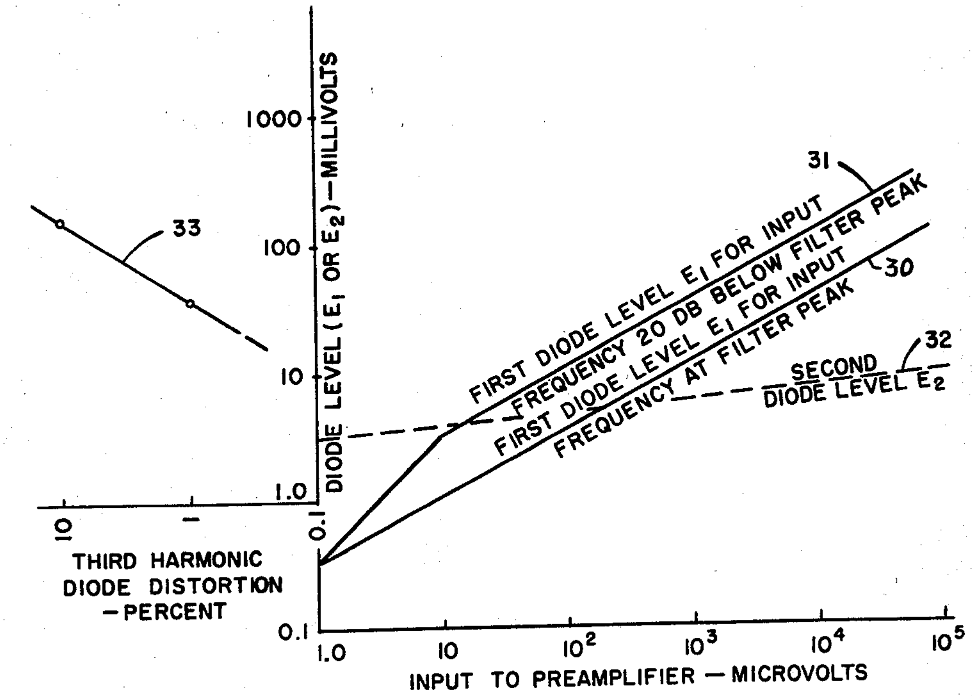
Figure 2 is a graph of typical operating voltage relationships and resulting distortion found in the amplifier channel of Figure 1.

In Figure 2 are shown curves of typical operating conditions found in amplifiers such as that shown in Figure 1. On the right side of Figure 2 are plotted the diode levels $E_1$ and $E_2$ in millivolts, measured at the correspondingly labeled points of Figure 1, for various input voltages to the preamplifier 11 plotted as abscissas. The diode level $E_1$ of the first diode shunt 13 is shown either by the line 30 or the line 31, depending on whether the input frequency lies at the peak of the filter 17 or is outside of the filter frequency range, such as a frequency at a point 20 db below the filter peak frequency. The difference between the curves 30 and 31 is due to the presence of filter 17, since a larger control voltage $E_c$ is produced by the peak-frequency signal passing through filter 17 into amplifier 24, as compared with the smaller control voltage $E_c$ produced by a frequency that is more or less blocked by the filter.

Due to the substantial degree of gain control exerted by the first diode shunt 13, the diode level $E_2$ of the second diode shunt 19, shown as the dashed line 32, undergoes much less extreme variations.

On the left side of Figure 2 is shown by the graph 33 the percent of third harmonic distortion produced by the diodes as a function of their voltage level. For a diode voltage level of about 40 millivolts, the third harmonic distortion is about 1 percent, and this percentage increases very rapidly with higher voltage levels. The diode level of 40 millivolts corresponds to about 10 millivolts input to the preamplifier 11 of a signal at the filter peak frequency. However, such a diode level occurs with only about 1 millivolt input to the preamplifier 11 of a frequency which is 20 db down the filter frequency curve from the peak frequency of filter 17.

This one percent distortion may not appear to be serious if only the signal frequency be considered. If, however, it is the distortion of a frequency which has its third harmonic in the pass band of filter 17, it is emphasized to the extent that the filter emphasizes this third harmonic over the fundamental. For example, if the filter peak is about 75 cycles, while the frequency which is down 20 db on the filter curve is 25 cycles, this means that the filter response at 75 cycles is ten times that at 25 cycles. Then a one percent distortion of a 25-cycle wave of one millivolt input amplitude is emphasized by a factor of ten. This results in a distortion, relatively speaking, of ten percent in the output of the system to the galvanometer 21 for only one millivolt of 25-cycle input to the preamplifier. Thus, it is apparent that even moderate levels of frequencies outside of the filter frequency range but possessing harmonics in this range can contribute substantial percentages of distortion to the system output.

It appears that the critical point is the diode level $E_1$ of the first diode shunt. This level can be decreased by causing these diodes to attenuate more; that is, to assume a lower effective value of resistance for a given value of $E_c$, the control voltage. As the sensitivity of diodes for control voltages varies over a considerable range, it may be thought possible to select for use in the shunt resistor circuit 13, diodes which will have the desired greater sensitivity. For high signal levels, when the amplifier is operating at low gain, distortion due to the raising of the first diode level $E_1$ can be avoided in this manner.

This selection, however, is improper if the stability of the amplifier system be considered. For the condition of low signal amplitude and high amplifier gain, the selected first diodes will also provide the greater share of attenuation, leaving correspondingly less of the total attenuation to be provided by the second diode circuit 19. Thus, when the gain of the amplifier is highest, the attenuation of shunt 19 will be lowest, and the loop gain of the automatic gain control, viewed from the position of the first diodes 13 and thus including amplifier stages 15 and 16 as well as amplifier 24, is at a higher level than would be necessary or desirable under these conditions. Instability will often result.

Therefore, under high-gain, low-signal conditions the reverse situation of having low sensitivity in the first diode shunt and high sensitivity in the second diode shunt 19 is to be preferred for purposes of amplifier stability. That is, if at high amplifications the small total amounts of needed attenuation are provided by the second diode shunt 19, the loop gain acting on the first diode shunt is correspondingly reduced.

This means that, in merely selecting the diodes to have certain sensitivities for certain locations in the circuit, a conflict occurs between the need to avoid distortion at high signal levels and the need for stability at low signal levels.

Figure 3:
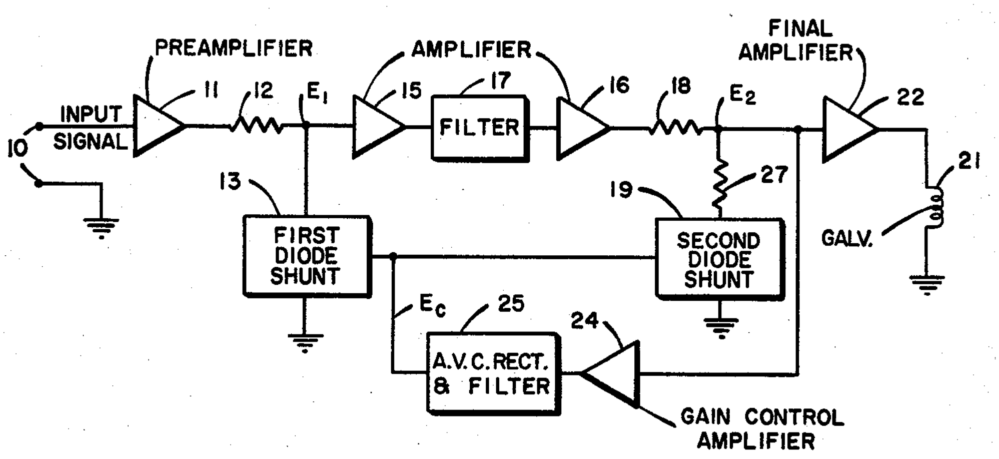
Figure 3 is a block diagram, similar to Figure 1, of one embodiment of the invention.

In Figure 3 is shown a modification of the circuit of Figure 1, made in accordance with my invention, which avoids the distortion at high signal levels noted in connection with Figure 1. This comprises adding a resistor 27 so that it and the second diode shunt 19 are connected in series between the point $E_2$ and ground. The resistor 27 represents a limiting value of resistance for the shunt arm of this second attenuator, and thus limits the attenuation which it can provide. At low signal levels the resistance of shunt circuit 19, and of shunt circuit 13 also, will be large compared to the value of the resistor 27. In this condition the attenuation of the two attenuator shunts 13 and 19 will be approximately equal. As the signal level increases, however, the resistance of shunt circuit 19 decreases until it assumes a value less than resistance 27. Thus, the attenuation produced by the second attenuator approaches a maximum value. Accordingly, the voltage applied to the gain control amplifier 24 increases, and a larger value of control voltage $E_c$ acts on the first diode shunt 13. The same voltage $E_c$ acts on shunt 19, but its effect on the attenuation produced is reduced or made negligible by resistor 27. Thus, the effect of resistor 27 is the desired one of increasing the control voltage acting on the first diode shunt 13 for high signal levels.

Figure 4:
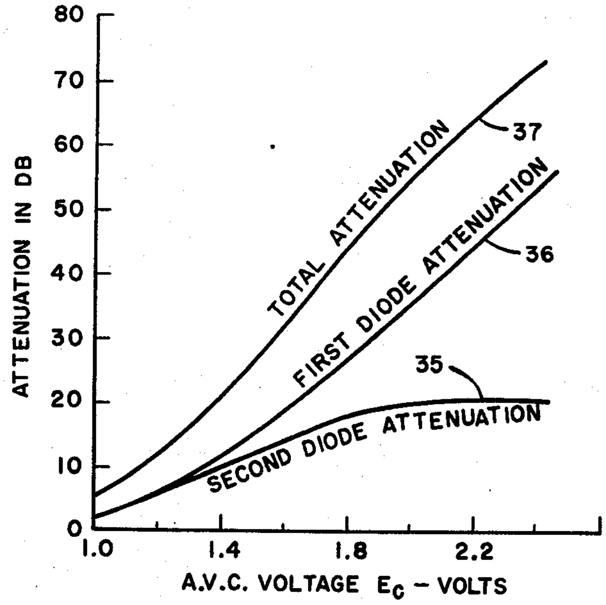
Figure 4 is a graph of the voltage relations and attenuation of the amplifier system of Figure 3.

These operating conditions of this circuit are shown by Figure 4. As is shown by curve 35 of this figure, the second diode attenuation approaches a constant value as the control voltage $E_c$ increases, which value is represented by the ratio of the resistance 27 to the resistance 18. The first diode attenuation shown by curve 36, however, is correspondingly increased, so that the total attenuation shown by curve 37 is a reasonably linear function over the normal range of control voltages $E_c$.

Figure 5:
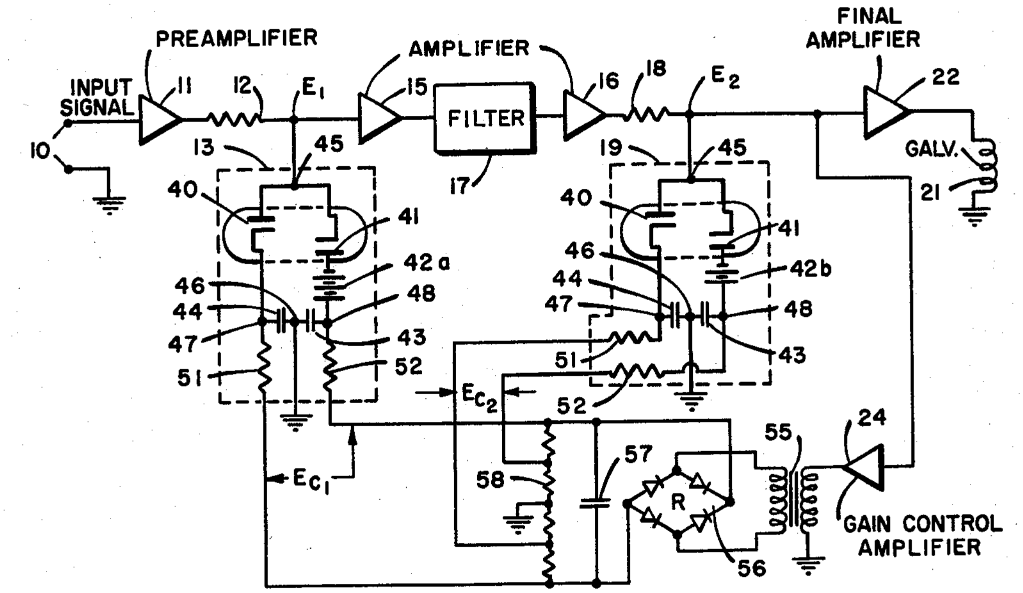
Figure 5 is a block diagram, with some parts in detail, of a preferred embodiment of the invention.

The preferred embodiment of my invention is shown in Figure 5. This embodiment not only provides the desired increased attenuation by the first diode shunt 13 for high signal levels but also varies the ratio of attenuation between the circuits 13 and 19 so that the stabiliy of the amplifier is improved at low signal levels. This figure also shows in some detail the circuitry of the diode shunts 13 and 19 and of the gain-control feedback loop components contained in the unit 25.

Each of the diode shunt units 13 and 19 includes a pairi of diodes 40 and 41 connected in series, along with a source of bias voltage 42, in one arm of a bridge circuit. The other arm of the bridge circuit comprises the condensers 43 and 44 connected in series. The junction point 45 between the diodes 40 and 41 is preferably connected to the point $E_1$ or $E_2$ of the signal-carrying leads, while the junction point 46 between condensers 43 and 44 is connected to ground. The other bridge terminals 47 and 48, respectively, the junction points between the condensers and the diodes, constitute the bridige diagonal across which the control voltage $E_{c1}$ or $E_{c2}$ is applied through series resistances 51 and 52, respectively.

The gain-control voltage supply comprises a transformer connected to the output of amplifier 24, which transformer feeds a bridge rectifier circuit 56 to produce a direct-current voltage which is applied to a condenser 57. The DC voltage of condenser 57 is applied to a voltage divider 58, which may comprise four equal resistors connected in series with their center point connected to ground.

In order to insure that the major portion of the control voltage $E_{c1}$ is applied to the first diode shunt, this voltage is taken across the entire voltage divider 58 and applied to the control terminals of the diode shunt 13. At low signal levels, however, this voltage is prevented from actuating the shunt 13 by the opposite potential of the bias voltage source 42*a*. This bias voltage source is substantially larger than the corresponding bias voltage 42*b* of the shunt 19. A fraction, such as half, of the voltage appearing across divider 58 is taken off as control voltage $E_{c2}$ for control of the diode shunt 19. The relative magnitudes of this control voltage and of the opposing bias voltage 42*b* are so chosen that substantially all of the attenuation needed at low signal levels, when the amplifier gain is high, is provided by the shunt 19, while at the same time the relative magnitudes of $E_{c1}$ and bias voltage 42*a* are such that the resistance of shunt 13 remains high. If necessary to provide proper values of $E_{c2}$ relative to the second diode bias 42*b*, the gain of amplifier 24 is increased. In this example, it may be assumed that it has been doubled.

At some intermediate value of signal level and amplifier gain the attenuation provided by shunt 13 becomes equal to that of 19 and thereafter increases with signal level much more rapidly than the attenuation of shunt 19.

Figure 6:
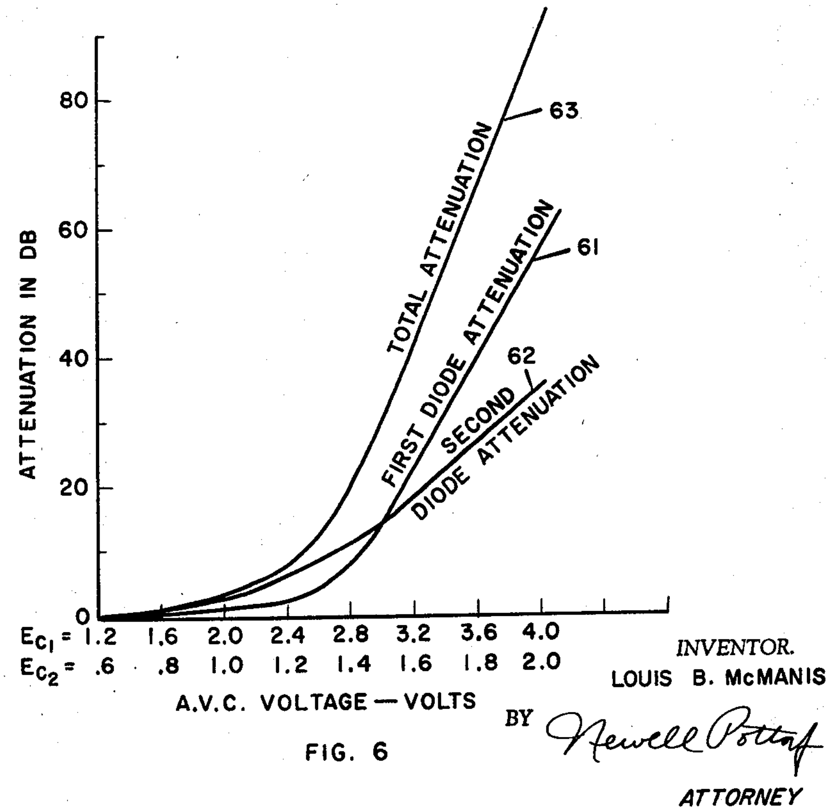
Figure 6 is a graph of the attenuation produced by the embodiment of Figure 5.

This is shown graphically by Figure 6 where the total attenuation, shown by curve 63, is provided substantially entirely by the second diodes, shown as curve 62, for low control voltages of the AVC circuit, while for high values of attenuation and AVC voltage the major attenuation is provided by the first diodes in accordance with curve 61, and the contribution of the second diodes, curve 62 is appreciably less. As will be apparent from what has been pointed out above, these conditions of operation both provide stability of the amplifier at high gain levels, where the signal input amplitude is low, and avoid distortion at high signal levels when the amplifier gain is reduced. Thus, this embodiment of the invention accomplishes both of the main objectives of the invention simultaneously.

In this example and in drawing the curves of Figure 6, the use of four equal resistors in the voltage divider 58 makes the value of $E_{c1}$ always twice that of $E_{c2}$. Other values of the resistors could be used in divider 58 to provide a different value of this ratio of voltages, while operation in accordance with the invention could still be carried out if corresponding or offsetting adjustments were made in bias voltages 42*a* and 42*b*.

While it has been assumed that the diodes 40 and 41 in the two shunt circuits 13 and 19 are all identical in characteristics, it is not essential that this be so. More sensitive diodes can be used in the shunt circuit 13 provided that the relative magnitudes of the bias voltage 42*a* and the control voltage $E_{c1}$ are such that these diodes are substantially inoperative at low signal levels.

Still another possibility is a partial combination of the embodiments of Figures 3 and 5, wherein the same control voltage $E_c$ is applied to both the first and second diodes, while the first diodes are of higher sensitivity than the second but are prevented from attenuating at high-gain conditions by a larger bias voltage 42*a*. Resistor 27 is present also but of negligible effect. $E_c$ thus acts initially upon only the second diodes, but as the input signal amplitude increases, it overcomes bias 42*a* and the first diodes become active also. Upon still further increases in signal, the limiting action of resistor 27 becomees operative and causes an even greater rate of increase of $E_c$ with signal level, thereby holding $E_1$ down to values where the distortion is satisfactorily low.

Furthermore, while the invention has been described as applicable to only two diode shunts 13 and 19 at different stages of the main amplifier channel, the same principles can readily be applied to three or more such attenuating stages if a still wider range of gain control is considered necessary. While the invention has thus been described with reference to the foregoing specific embodiments and details, it is to be understood that still further modifications will be apparent to those skilled in the art. The invention therefore should not be considered as limited to these details, but its scope is properly to be ascertained by reference to the appended claims.

I claim:

1. An automatic volume control amplifier channel adapted to be connected from the output of a seismometer to the input of a recorder comprising a preamplifier, a first attenuator comprising a series resistance and a first variable shunt resistance to ground, at least one intermediate amplifier stage including a filter passing desired frequencies, a second attenuator comprising a series resistance and a second variable shunt resistance to ground, and a final amplifier, all of the foregoing elements being connected in series in the order named, means connected to a signal-carrying lead of said channel at a point following said second attenuator for producing a direct control voltage proportional to the signal amplitude at said point averaged over a period of time, means for applying the full value of said control voltage to said first shunt resistance to control its resistance value, means for applying only a fraction of said control voltage to said second shunt resistance to control its resistance value in the same way as but less rapidly than said first shunt resistance value, each of said shunt resistances comprising a bridge circuit including a pair of thermionic diodes and a source of bias voltage connected in series in one branch thereof, the diodes of both said first and second shunt resistances having similar sensitivities to said control voltage, and the bias voltage for said first variable shunt resistance being substantially higher than the bias voltage for said second shunt resistance, the relative magnitudes of the first shunt bias voltage and said full control voltage being such that at low signal levels said control voltage is substantially ineffective to lower the value of said first variable shunt resistance, whereby said second shunt resistance is primarily effective at said low signal levels, while said first shunt resistance produces the major portion of attenuation at high signal levels.

2. An automatic volume control amplifier channel adapted to be connected from the output of a seismometer to the input of a recorder comprising a preamplifier, a first attenuator comprising a series resistance and a first variable shunt resistance to ground, at least one intermediate amplifier stage including a filter passing desired frequencies, a second attenuator comprising a series resistance and a second variable shunt resistance to ground, and a final amplifier, all of the foregoing elements being connected in series in the order named, an automatic volume control amplifier having its input connected to a signal-carrying lead of said amplifier at a point following said second attenuator, a rectifier connected to the output of said volume-control amplifier, a voltage-dividing network connected across the output of said rectifier, means applying substantially the full voltage of said voltage-dividing network to said first variable shunt resistance to control its resistance value, means applying less than said full voltage to said second variable shunt resistance to control its resistance value in the same way but less rapidly than said first shunt resistance value, each of said shunt resistances comprising a bridge circuit including a pair of thermionic diodes and a source of bias voltage connected in series in one branch thereof, the bias voltage for said first variable shunt resistance being substantially higher than the bias voltage for said second shunt resistance, the relative magnitudes of the bias voltage for said first variable shunt resistance and the full voltage of said voltage-dividing network at low signal levels being substantially ineffective to lower the value of said first variable shunt resistance, whereby said second shunt resistance is primarily effective at said low signal levels, while said first shunt resistance produces the major portion of attenuation at high signal levels.

3. An automatic volume control amplifier channel as in claim 2 wherein the diodes of said first variable shunt resistance are selected to have a higher sensitivity to control voltage than the diodes of said second shunt resistance.

4. An automatic volume control amplifier channel as in claim 2 including also a fixed resistance in series with only said second shunt resistance, said fixed and second resistance forming the shunt arm of said second attenuator, whereby said fixed resistance forms the lower limit for the resistance of only said shunt arm.

5. An automatic volume control amplifier channel adapted to be connected from the output of a seismometer to the input of a recorder comprising a preamplifier, a first attenuator comprising a series resistance and a first variable shunt resistance to ground, at least one intermediate amplifier stage including a filter passing desired frequencies, a second attenuator comprising a series resistance and a second shunt resistance to ground, and a final amplifier, all of the foregoing elements being connected in series in the order named, an automatic volume control amplifier having its input connected to a signal-carrying lead of said amplifier at a point following said second attenuator, rectifying and filtering means connected to the output of said control amplifier to produce a direct-current voltage varying in amplitude as the average level of the signal at said connection point, said first variable shunt resistance forming the entire shunt path to ground of said first attenuator, while said second shunt resistance to ground comprises a fixed resistance and a second variable resistance connected in series, and each of said first and second variable resistances comprising a bridge circuit including a pair of thermionic diodes and a source of bias voltage connected in series in one branch thereof, and means applying said direct-current control voltage to both of said first and second variable resistances to control their resistance values, said fixed resistance acting as a limiting resistance value for said second shunt resistance to ground, whereby at high signal levels the relative attenuation of said second attenuator is reduced and the magnitude of said control voltage acting primarily on said first shunt resistance is substantially greater than it would be in the absence of said fixed resistance.

References Cited in the file of this patent

UNITED STATES PATENTS

| | | |
|---|---|---|
| 2,434,155 | Haynes | Jan. 6, 1948 |
| 2,547,703 | Hermont et al. | Apr. 3, 1951 |
| 2,554,905 | Hawkins et al. | May 29, 1951 |
| 2,558,002 | Ross | June 26, 1951 |
| 2,663,002 | McManis et al. | Dec. 16, 1953 |

UNITED STATES PATENT OFFICE

CERTIFICATE OF CORRECTION

Patent No. 2,935,697 May 3, 1960

Louis B. McManis

It is hereby certified that error appears in the printed specification of the above numbered patent requiring correction and that the said Letters Patent should read as corrected below.

Column 7, line 15, for "resistance" read -- shunt resistances --.

Signed and sealed this 11th day of October 1960.

(SEAL)
Attest:

KARL H. AXLINE
Attesting Officer

ROBERT C. WATSON
Commissioner of Patents